3,822,345
DENTIFRICE COMPOSITION
Leo Thomas Murray, East Brunswick, and Gerhard Martin Salzmann, Franklin Lakes, N.J., assignors to Colgate-Palmolive Company, New York, N.Y.
No Drawing. Continuation-in-part of application Ser. No. 126,350, Mar. 19, 1971, which is a continuation-in-part of application Ser. No. 818,098, Apr. 21, 1969, both now abandoned. This application Aug. 25, 1971, Ser. No. 174,962
Int. Cl. A61k 7/16
U.S. Cl. 424—52    7 Claims

ABSTRACT OF THE DISCLOSURE

Dentifrice composition containing a monofluorophosphate salt and as a polishing material at least a major amount of fine particle size alumina. Preferably the alumina is alpha alumina trihydrate and is mixed with insoluble alkali metal metaphosphate, the amount of said alumina being at least about equal of the amount of said alkali metal metaphosphate. This dentifrice retains a desirable level of soluble fluoride upon aging.

---

This application is a Continuation-In-Part of Ser. No. 126,350, filed Mar. 19, 1971, now abandoned, which is a Continuation-In-Part of Ser. No. 818,098, filed Apr. 21, 1969, now abandoned.

The present invention relates to a dentifrice composition containing as a fluorine providing material a water soluble monofluorophosphate salt.

Various fluorine providing materials including water soluble monofluorophosphate salts have been used in dentifrice compositions. The polishing materials which may be used in such dentifrices vary, depending in part upon the particular fluorine providing material employed. Thus fluorine providing materials and polishing materials have been the subject of much investigation in order to find dentifrices containing such fluorine providing materials and polishing materials which dentifrices retain a high proportion of soluble fluoride from the fluorine providing material upon storage and aging.

It is an object of this invention to provide a dentifrice composition in which the fluorine providing material is a monofluorophosphate salt, which dentifrice retains a desirable level of fluoride upon aging.

Other objects will be apparent from consideration of the following description.

In accordance with certain of its aspects, this invention relates to a dentifrice composition comprising a water soluble monofluorophosphate salt in amount which provides about 0.01–1% fluorine to said composition and about 20–95% by weight of polishing material comprising at least a major amount of alumina in which at least about 85% of the particles are less than 20 microns in size and selected from the group consisting of alpha alumina trihydrate, kappa type alumina, gamma phase alumina, beta phase alumina, microcrystalline alumina and mixtures thereof.

The water soluble monofluorophosphate salt used in the instant composition is preferably an alkali metal monofluorophosphate such as sodium monofluorophosphate, lithium monofluorophosphate, potassium monofluorophosphate and ammonium monofluorophosphate. The preferred salt is sodium monofluorophosphate, $Na_2PO_3F$, which, as commercially available, may vary considerably in purity. It may be used in any suitable purity provided that any impurities do not substantially adversely affect the desired properties. In general, the purity is desirably at least about 80%. For best results, it should be at least 85%, and preferably at least 90% by weight of sodium monofluorophosphate with the balance being primarily impurities or by-products of manufacture such as sodium fluoride, water-soluble sodium phosphate salt, and the like. Expressed in another way, the sodium monofluorophosphate employed should have a total fluoride content of above 12%, preferably above 12.7%; a content of not more than 1.5%, preferably not more than 1.2% of free sodium fluoride; and a sodium monofluorophosphate content of at least 12%, preferably at least 12.1%, all calculated as fluorine.

Other monofluorophosphate salts which have sufficient water solubility for use in the instant invention include calcium monofluorophosphate, magnesium monofluorophosphate and aluminum monofluorophosphate. In accordance with this invention the term "monofluorophosphate" also includes monofluorophosphates such as $Na_4P_3O_9F$, $K_4P_3O_9F$, $(NH_4)_4P_3O_9F$, $Na_3KP_3O_9F$, $$(NH_4)_3NaP_3O_9F$$

and $Li_4P_3O_9F$.

Typically, the monofluorophosphate is present in amount which provides about 0.01–1% fluorine to the dentifrice. Thus, sodium monofluorophosphate is present, typically in amount of about 0.05% to about 7.6%.

Alumina may be the sole polishing agent. Upon aging, the soluble monofluorophosphate as fluoride retained in the dentifrice can be magnified if the alumina is mixed with another polishing agent such as an alkali metal metaphosphate, in a ratio of the other polishing agent to alumina of from about 1:500 to about 1:1.

The insoluble alkali metal metaphosphate which may be used in the polishing material are preferably the insoluble sodium and potassium salts of polymetaphosphoric acid. These materials are known in the art. The insoluble sodium metaphosphate is preferred. Such materials may be formed in any suitable manner, as illustrated by Thorpe's Dictionary of Applied Chemistry, Vol. 9 (4th ed.), pp. 510–511. The forms of insoluble sodium metaphosphate known as Madrell's salt and Kurrol's salt are further examples of suitable materials. These metaphosphate salts exhibit only a minute solubility in water, and are commonly referred to as insoluble metaphosphates therefore. There is present a minor amount of soluble phosphate material as impurities, usually of the order of a few percent such as up to about 4% by weight. The amount of soluble trimetaphosphate in the case of insoluble sodium metaphosphate may be reduced by washing with water if desired. The insoluble alkali metal metaphosphate is typically employed in powder form of a size such that no more than about 1% of the material is larger than about 37 microns.

The alumina employed in accordance with the instant invention is small in particle size, i.e., at least about 85% of the particles are smaller than 20 microns and is preferably hydrated, such as that classified as gibbsite (alpha alumina trihydrate) and normally represented chemically as $Al_2O_3 \cdot 3H_2O$ or $Al(OH)_3$. The average particle size of gibbsite is generally about 6 to 9 microns with the following size distribution:

| Microns | Percent |
|---|---|
| <30 | 94–99 |
| <20 | 85–93 |
| <10 | 56–67 |
| <5 | 28–40 |

Other types of alumina which may be employed in accordance with the instant invention include kappa type alumina, gamma phase alumina, beta phase alumina and mixtures thereof with alpha alumina trihydrate. Microcrystalline alumina having a mean particle size of as little as 0.3 micron or less than 90–95% of the particles being smaller than 0.5 micron may also be used. The alpha alumina trihydrate sold by Alcoa as C333 is a fine grade of gibbsite and is particularly highly desirable. The average particle size of C333 alumina is about 2.5–8.5 microns. It is obtained by fine grinding of the grade of alumina trihydrate sold by Alcoa as C33.

When a minor polishing agent such as insoluble alkali metal metaphosphate is employed, its ratio to alumina is from about 1:500 to substantially 1:1, that is about equal. Dentifrices containing these polishing components and water soluble monofluorophosphate salt retain desirable levels of soluble fluoride, for example, at least about 40% of the original content of monofluorophosphate after accelerated aging of the dentifrice for nine weeks at about 49° C. Suitable ratios of insoluble alkali metal metaphosphate to alumina may vary from substantially 1:1 to about 1:500, preferably to about 1:47.25. Typically highly desirable ratios are in the range of about 1:3 to about 1:9. When the ratio of the metaphosphate to the alumina is substantially 1:1, the weight amount of metaphosphate may be in slight excess, in view of the small amount of soluble content of the metaphosphate. In addition to alumina and insoluble alkali metal metaphosphate, or in place of the insoluble alkali metal metaphosphate, the polishing material may also contain a minor amount, say about 0.5% to 5%, preferably about 1% of an additional polishing component to aid in desirable polishing of dental enamel. Typical examples of such components include water insoluble alkaline earth metal phosphates, such as anhydrous dicalcium phosphate, dicalcium phosphate dihydrate, tricalcium phosphate, calcium carbonate/calcium, pyrophosphate, trimagnesium phosphate silica and the like.

The total polishing material content of the dentifrice is variable, but will generally be up to about 95% by weight of the total composition. In the case of a dental cream, such polishing agents will generally be about 20% to about 75%, and preferably about 40% to 55%, whereas in tooth powders the polishing agents will usually be in greater proportion, such as about 70% to about 95%.

In the preparation of tooth powders, it is usually sufficient to admix mechanically, for example, by milling, the various solid ingredients, in appropriate quantities and particle sizes.

Any suitable surface active or detersive material may be included in the dentifrice compositions. Such compatible materials are desirable to provide additional detersive, foaming and antibacterial properties depending upon the specific type of surface active material and are selected similarly. These detergents are water-soluble compounds usually, and may be anionic, nonionic or cationic in structure. It is preferred to use the water-soluble non-soap or synthetic organic detergents usually. Suitable detersive materials are known and include, for example, the water-soluble salts of higher fatty acid monoglyceride monosulfate detergent (e.g. sodium coconut fatty acid monoglyceride monosulfate), higher alkyl sulfate (e.g. sodium lauryl sulfate), alkyl aryl sulfonate (e.g. sodium dodecyl benzene sulfonate, higher fatty acid esters of 1,2-dihydroxy propane sulfonate (e.g. sodium coconut fatty acid ester of 1,2-dihydroxy propane sulfonate) and the like.

The various surface active materials may be used in any suitable amount, generally from about 0.05 to about 10% by weight, and preferably from about 0.5 to 5% by weight of the dentifrice composition.

It is a further embodiment of the present invention to use the substantially saturated higher aliphatic acyl amides of lower aliphatic amino carboxylic acid compounds, such as those having 12 to 16 carbons in the acyl radical. The amino acid portion is derived generally from the lower aliphatic saturated monoaminocarboxylic acids having about 2 to 6 carbons, usually the monocarboxylic acid compounds. Suitable compounds are the fatty acid amides of glycine, sarcosine, alanine, 3-aminopropanoic acid and valine having about 12 to 16 carbons in the acyl group.

It is preferred to use the N-lauroyl, myristoyl and palmitoyl sarcoside compounds however for optimum effects.

The amide compounds may be employed in the form of the free acid or preferably as the water-soluble salts thereof, such as the alkali metal, ammonium, amine and alkylolamine salts. Specific examples thereof are sodium and potassium N-lauroyl, myristoyl and palmitoyl sarcosides, ammonium and ethanolamine N-lauroyl sarcoside, N-lauroyl sarcosine, and sodium N-lauroyl glycide and alanine. For convenience herein, reference to "amino carboxylic acid compound," "sarcoside," and the like refers to such compounds having a free carboxylic group or the water-soluble carboxylate salts.

Such materials are utilized in pure or substantially pure form. They should be as free as practicable from soap or similar higher fatty acid material which tends to reduce the activity of these compounds. In usual practice, the amount of such higher fatty acid material is less than 15% by weight of the amide and insufficient to substantially adversely affect it, and preferably less than about 10% of said amide material.

In dental cream formulations, the liquids and solids should be proportioned to form an extrudable creamy mass of desirable consistency. In general, liquids in the dental cream will comprise chiefly water, glycerine, sorbitol, propylene glycol, or the like, including suitable mixtures thereof. It is advantageous usually to use a mixture of both water and a humectant or binder such as glycerine or sorbitol. It is preferred to use glycerine. The total liquid content will generally be about 20–75% by weight of the formulation. It is preferred to use also a gelling agent in dental creams such as the natural and synthetic gum and gum-like material, e.g. Irish moss, gum tragacanth, sodium carboxymethylcellulose, polyvinylpyrrolidone, starch and the like. The Irish moss and sodium carboxymethylcellulose are compatible particularly and are preferred gelling agents as illustrated. The gum content is usually in an amount up to about 10% and preferably about 0.5–5% by weight of the formulation.

Various other materials may be incorporated in the oral preparations of this invention. Examples thereof are coloring or whitening agents, preservatives, silicones, chlorophyll compounds and ammoniated materials such as urea, diammoniumphosphate and mixtures thereof. These adjuvants are incorporated in the instant compositions in amounts which do not substantially adversely affect the properties and characteristics suitably selected and used in proper amount depending upon the particular type of preparation involved.

For some purposes it may be desirable to include antibacterial agents in the compositions of the present invention. Typical antibacterial agents which may be used in amounts of about 0.01% to about 5%, preferably about 0.05% to about 1.0%, by weight of the dentifrice composition include:

$N^1$-4(chlorobenzyl)-$N^5$-(2,4-dichlorobenzyl)biguanide;
p-chlorophenyl biguanide;
4-chlorobenzhydryl biguanide;
4-chlorobenzhydrylguanylurea;
N-3-lauroxypropyl-$N^5$-p-chlorobenzylbiguanide;
1,6-di-p-chlorophenylbiguanidehexane;
1-(lauryldimethylammonium)-8-(p-chlorobenzyldimethylammonium) octane dichloride;
5,6-dichloro-2-guanidinobenzimidazole;
$N^1$-p-chlorophenyl-$N^5$-laurylbiguanide;
5-amino-1,3-bis(2-ethylhexyl)-5-methylhexahydropyrimidine;

and their non-toxic acid addition salts.

Any suitable flavoring or sweetening materials may be employed in formulating a flavor for the compositions of the present invention. Examples of suitable flavoring constituents include the flavoring oils, e.g., oils of spearmint, peppermint, wintergreen, sassafras, clove, sage, eucalyptus, marjoram, cinnamon, lemon and orange, as well as methylsalicylate. Suitable sweetening agents include sucrose, lactose, maltose, sorbitol, sodium cyclamate and saccharine. Suitably, flavor and sweetening agent may together comprise from about 0.01 to 5% or more of the instant invention.

The dental creams should have a pH practicable for use. A pH range of 6 to 9 is particularly desirable. The reference to the pH is meant to be the pH determination directly on the dental cream. If desired, materials such as citric acid may be added to adjust the pH to say 6.5 to 7.5. When citric acid is present, the dental cream typically retains at least about 40% of the original content of monofluorophosphate after accelerated aging for nine weeks at about 49° C. When the pH is not adjusted with materials such as citric acid, the dental cream typically retains at least about 45%, and generally more than 50%, of the original content of monofluorophosphate after accelerated aging for nine weeks at about 49° C.

The instant dentifrice preparations are highly efficacious in use. When prepared as dental creams they exhibit desirable cosmetic and rheological properties and may be stored and dispensed from conventional collapsible tubes. For example, compositions of the invention may be stored in unlined aluminum tubes.

The following specific examples are further illustrative of the nature of the present invention, but it is to be understood that the invention is not limited thereto. The compositions are prepared in the usual manner and all amounts of the various ingredients are by weight unless otherwise specified.

Example 1

The following dentifrices are prepared. The content of sodium monofluorophosphate in each is equivalent to 0.1% fluoride ion:

|  | Percent | | |
|---|---|---|---|
|  | A | B | C |
| Humectant (glycerine) | 18.0 | 18.0 | 18.0 |
| Sodium benzoate | 0.5 | 0.5 | 0.5 |
| Sodium saccharine | 0.2 | 0.2 | 0.2 |
| Citric acid | | 0.1 | 0.2 |
| Sodium monofluorophosphate | 0.76 | 0.76 | 0.76 |
| Insoluble sodium metaphosphate | 5.0 | 5.0 | |
| Hydrated alumina (C333) | 42.25 | 42.25 | 52.0 |
| Anhydrous dicalciumphosphate | 1.0 | 1.0 | |
| Sodium carboxymethylcellulose | 1.2 | 1.2 | 1.2 |
| Sodium N-lauroyl sarcosinate | 2.0 | 2.0 | 2.0 |
| Flavor | 0.9 | 0.9 | 0.9 |
| Water | Q.S. | Q.S. | Q.S. |

Each of dentifrices A, B and C has an initial soluble monofluorophosphate content as fluoride of 0.1. Each dentifrice is aged at 49° C. for several weeks with the soluble fluoride content determined periodically. The results with Compositions A and B in which the polishing material contains alumina and insoluble sodium metaphosphate and with Composition C in which insoluble sodium metaphosphate is not present are indicated below.

| Composition | Percent soluble monofluorophosphate as fluoride at 49° C. for— | | |
|---|---|---|---|
|  | 3 weeks | 6 weeks | 9 weeks |
| A | 0.081 | 0.064 | 0.062 |
| B | 0.069 | 0.064 | 0.051 |
| C | 0.057 | 0.041 | 0.030 |

Thus, all dentifrices retain soluble monofluorophosphate as fluoride and the presence of some insoluble metaphosphate markedly increases the ability of Compositions A and B to retain soluble monofluorophosphate as fluoride.

Example 2

Dentifrices corresponding to Dentifrice A of Example 1 in which the polishing material is varied as indicated below are prepared and aged at 49° C. for several weeks. The soluble fluoride content of the dentifrice is also indicated.

| Modified dentifrice A of Example 1 | $A_1$ | $A_2$ | $A_3$ |
|---|---|---|---|
| Polishing material percent: | | | |
| Insoluble sodium metaphosphate | 1.0 | 3.0 | 12.0 |
| Hydrated alumina (C333) | 46.25 | 44.25 | 35.25 |
| Anhydrous dicalcium phosphate | 1.0 | 1.0 | 1.0 |

| Composition | Percent soluble monofluorophosphate as fluoride at 49° C. for— | | |
|---|---|---|---|
|  | 3 weeks | 6 weeks | 9 weeks |
| $A_1$ | 0.077 | 0.059 | 0.049 |
| $A_2$ | 0.071 | 0.060 | 0.055 |
| $A_3$ | 0.082 | 0.073 | 0.057 |

Each of these dentifrices retains a high level of soluble monofluorophosphate as fluoride.

Example 3

Dentifrice corresponding to dentifrice B of Example 1 in which the polishing material is varied as indicated below is prepared and aged at 49° C. for several weeks. The soluble fluoride content of the dentifrice is also indicated.

| Modified dentifrice B of Example 1 | $B_1$ |
|---|---|
| Polishing material, percent: | |
| Insoluble sodium metaphosphate | 1.0 |
| Hydrated alumina (C333) | 46.25 |
| Anhydrous dicalcium phosphate | 1.0 |

| Composition | Percent soluble monofluorophosphate as fluoride at 49° C. for— | | |
|---|---|---|---|
|  | 3 weeks | 6 weeks | 9 weeks |
| $B_1$ | 0.063 | 0.060 | 0.044 |

This dentifrice too retains a high level of more than 40% of soluble monofluorophosphate as fluoride even after accelerated aging at 49° C. for 9 weeks.

Example 4

Dentifrice corresponding to dentifrice A of Example 1 in which the humectant and polishing material are varied as indicated below are prepared and aged at 49° C. for several weeks. The soluble monofluorophosphate as fluoride content of each dentifrice is also indicated below.

| Modified dentifrice A of Example | $A_4$ | $A_5$ | $A_6$ | $A_7$ | $A_8$ | $A_9$ |
|---|---|---|---|---|---|---|
| Humectant, percent: | | | | | | |
| Glycerine | 6.0 | 20.0 | 22.0 | 15.0 | 6.0 | 6.0 |
| Sorbitol (70%) | 16.0 | | | | 16.0 | 16.0 |
| Polishing material, percent: | | | | | | |
| Insoluble sodium metaphosphate | 5.0 | 5.0 | 5.0 | 5.0 | 12.0 | 24.0 |
| Hydrated alumina (C333) | 42.25 | 42.25 | 42.25 | 42.25 | 35.25 | 23.25 |
| Anhydrous dicalcium phosphate | 1.0 | 1.0 | 1.0 | 1.0 | 1.0 | 1.0 |

| Composition | Percent soluble monofluorophosphate as fluoride at 40° C. for— | | |
|---|---|---|---|
|  | 3 weeks | 6 weeks | 9 weeks |
| $A_4$ | 0.060 | 0.058 | 0.046 |
| $A_5$ | 0.073 | 0.063 | 0.060 |
| $A_6$ | 0.076 | 0.058 | 0.058 |
| $A_7$ | 0.078 | 0.072 | 0.056 |
| $A_8$ | 0.086 | 0.065 | 0.062 |
| $A_9$ | 0.083 | 0.071 | 0.069 |

Each of these dentifrices retains a high level of soluble monofluorophosphate as fluoride. In dentifrice $A_9$ the amount of the alumina is substantially equal to the amount of the insoluble portion of the metaphosphate.

Example 5

Dentifrices corresponding to dentifrice A of Example 1 in which Irish moss replaces sodium carboxymethyl cellulose and in which the humectant and polishing material are varied as indicated below are prepared and aged at 49° C. for several weeks. The soluble fluoride content of each dentifrice is also indicated below.

| Irish Moss modified dentifrice A of Example 1 | $A_{10}$ | $A_{11}$ |
|---|---|---|
| Humectant, percent: | | |
| Glycerine | 13.0 | 13.0 |
| Sorbitol (70%) | 20.0 | 20.0 |
| Polishing material, percent: | | |
| Insoluble sodium metaphosphate | 12.0 | 24.0 |
| Hydrated alumina (C333) | 35.25 | 23.25 |
| Anhydrous dicalcium phosphate | 1.0 | 1.0 |

| | Percent soluble monofluorophosphate as fluoride at 49° C. for— | | |
|---|---|---|---|
| Composition | 3 weeks | 6 weeks | 9 weeks |
| $A_{10}$ | 0.082 | 0.073 | 0.057 |
| $A_{11}$ | 0.084 | 0.075 | 0.068 |

Each of these dentifrices retains a high level of soluble monofluorophosphate as fluoride. In dentifrice $A_{11}$ the amount of the alumina is substantially equal to the amount of the insoluble portion of the metaphosphate.

Example 6

Dentifrice corresponding to dentifrice B of Example 1 in which the humectant and polishing material are varied as indicated below are prepared and aged at 49° C. for several weeks. The soluble fluoride content of each dentifrice is also indicated below.

| Modified dentifrice B of Example 1 | $B_2$ | $B_3$ |
|---|---|---|
| Humectant, percent: | | |
| Glycerine | 6.0 | 22.0 |
| Sorbitol (70%) | 16.0 | |
| Polishing material, percent: | | |
| Insoluble sodium metaphosphate | 5.0 | 5.0 |
| Hydrated alumina (C333) | 42.25 | 42.25 |
| Anhydrous dicalcium phosphate | 1.0 | 1.0 |

| | Percent soluble monofluorophosphate as fluoride at 49° C. for— | | |
|---|---|---|---|
| Composition | 3 weeks | 6 weeks | 9 weeks |
| $B_2$ | 0.070 | 0.050 | 0.038 |
| $B_3$ | 0.071 | 0.059 | 0.050 |

Each of these dentifrices too retains a high level of at least about 40% of soluble monofluorophosphate as fluoride even after accelerated aging at 49° C. for 9 weeks.

Example 7

Dentifrices corresponding to dentifrice B of Example 1 in which anhydrous dicalcium phosphate is omitted from the polishing material and the polishing material is otherwise varied as indicated below are prepared and aged at 49° C. for several weeks. The soluble monofluorophosphate as fluoride content of each dentifrice is also indicated below.

| Modified dentifrice B of Example 1 | $B_4$ | $B_5$ | $B_6$ |
|---|---|---|---|
| Polishing material, percent: | | | |
| Insoluble sodium metaphosphate | 1.0 | 0.5 | 0.1 |
| Hydrated alumina (C333) | 47.25 | 47.75 | 48.15 |

| | Percent soluble monofluorophosphate as fluoride at 49° C. for— | | |
|---|---|---|---|
| Composition | 3 weeks | 6 weeks | 9 weeks |
| $B_4$ | 0.070 | 0.063 | |
| $B_5$ | 0.071 | 0.058 | 0.054 |
| $B_6$ | 0.069 | 0.060 | 0.048 |

Each of these dentifrices too retain satisfactorily high levels of soluble monofluorophosphate as fluoride even after accelerated aging at 49° C. for 6 to 9 weeks.

It will be apparent to one skilled in the art that various modifications of the above examples may be made thereto.

We claim:

1. A dentifrice composition comprising a water soluble monofluorophosphate salt in amount which provides about 0.01–1% fluorine to said composition and about 20–95% by weight of a water insoluble compatible polishing material comprising at least a major amount of alumina in which at least about 85% of the particles are less than 20 microns in size and selected from the group consisting of alpha alumina trihydrate, kappa type alumina, gamma phase alumina, beta phase alumina, microcrystalline alumina and mixtures thereof and an insoluble alkali metal metaphosphate, the ratio of said metaphosphate to said alumina being from about 1:500 to about 1:1.

2. The dentifrice composition of Claim 1 wherein said alumina is alpha alumina trihydrate having an average particle size of about 2.5–8.5 microns.

3. The dentifrice claimed in Claim 1 wherein said alumina is alpha alumina trihydrate having an average particle size of about 2.5–8.5 microns.

4. The dentifrice composition of Claim 1 wherein said metaphosphate is insoluble sodium metaphosphate and the ratio of said metaphosphate to said alumina is from about 1:47.25 to about 1:1.

5. The dentifrice composition of Claim 1 wherein said metaphosphate is insoluble sodium metaphosphate and the ratio of said metaphosphate to said alumina is from about 1:9 to about 1:3.

6. The dentifrice composition of Claim 1 wherein said polishing material also contains a minor amount of a water insoluble alkaline earth metal phosphate.

7. The dentifrice composition of Claim 6 wherein said water insoluble alkaline earth metal phosphate is anhydrous dicalcium phosphate.

References Cited

UNITED STATES PATENTS

| 3,034,967 | 5/1962 | Apperson et al. | 424—52 |
| 2,818,371 | 12/1957 | Wessinger | 424—52 |

FOREIGN PATENTS

| 1,076,851 | 7/1967 | Great Britain | 424—52 |
| 1,559,196 | 1/1969 | France | 424—49 |

OTHER REFERENCES

Ericsson, Acta Odontal. Scand., Vol. 20, pp. 441–451, 1962.

RICHARD L. HUFF, Primary Examiner

U.S. Cl. X.R.

424—57